United States Patent [19]

Oka

[11] Patent Number: 5,250,639
[45] Date of Patent: Oct. 5, 1993

[54] POLYANILINE DERIVATIVES AND THEIR PRODUCTION PROCESS

[75] Inventor: Osamu Oka, Shizuoka, Japan

[73] Assignee: Tomoegawa Paper Co., Ltd., Tokyo, Japan

[21] Appl. No.: 909,530

[22] Filed: Jul. 8, 1992

[30] Foreign Application Priority Data

Jul. 9, 1991 [JP] Japan ................................. 3-193565
Jan. 17, 1992 [JP] Japan ................................. 4-25951
Jun. 23, 1992 [JP] Japan ................................. 4-187326

[51] Int. Cl.$^5$ ........................................ C08F 283/00
[52] U.S. Cl. ................................................ 525/540
[58] Field of Search ........................................ 525/540

[56] References Cited

PUBLICATIONS

Abe et al. "Soluble and High Molecular Weight Polyaniline", *J. Chem. Soc. Chem. Commun.*, pp. 1736-1738 (1989).

*Primary Examiner*—John Kight, III
*Assistant Examiner*—T. Mosley
*Attorney, Agent, or Firm*—Lowe, Price, LeBlanc & Becker

[57] ABSTRACT

This invention provides a novel graft polyaniline derivative soluble or gelatinizable in general organic solvents, which forms elastic self-standing films or fibers, and also their production process. The graft polyaniline derivative is represented by the following formula (I) which consists of a quinodiimine unit structure, an imino-1,4-phenylene unit structure and a N-polyether chain substituted imino-1,4-phenylene unit structure bonding at random,

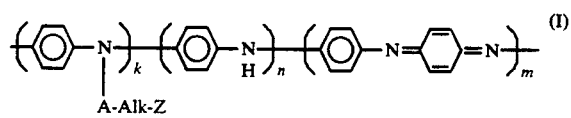

wherein k is an integer of at least 1, m and n each is zero or an integer of at least 1, k+m+n=10 to 5,000, m/(n+m)=0 to 1, Alk represents a polyether chain having a number average molecular weight of 100 to 100,000 and having oxygen atoms at the both terminals, A represents a specific linking group.

14 Claims, No Drawings

POLYANILINE DERIVATIVES AND THEIR PRODUCTION PROCESS

BACKGROUND OF THE INVENTION

1. Field of the Invention

The present invention relates to novel polyaniline derivatives soluble or gelatinizable in organic solvent, which are capable of forming elastic self-standing films, and also to their production process.

2. Description of the Related Art

Investigation has been conducted in recent years with a view toward applying polyanilines as new electronic materials or conductive materials in a wide variety of fields such as cell electrode materials, antistatic materials, electromagnetic shielding materials, functional devices—e.g., photoelectric transducers, optical memories and various sensors—, display devices, various hybrid materials, transparent electroconductors, and various terminal equipment.

Polyanilines however have a highly developed $\pi$-conjugated system. They are hence accompanied by the serious drawbacks that they are insoluble in most organic solvents and do not melt even when heated due to having a rigid main chain and the existence of strong interaction and many strong hydrogen bonds between polymer chains, and also have poor moldability and permit neither cast molding nor coating.

They are therefore formed, for example, into electroconductive composite materials by impregnating base materials of a desired shape—such as fibers, porous bodies or the like of high-molecular materials—with their corresponding aniline monomers and then bringing the monomers into contact with a suitable polymerization catalyst or subjecting the monomers to electropolymerization to polymerize the monomers. As an alternative, such aniline monomers are polymerized in the presence of powder of a thermoplastic polymer to obtain similar composite materials.

In the meantime, polyanilines soluble in N-methyl-2-pyrrolidone alone have also been synthesized by suitably choosing the polymerization catalyst and reaction temperature [M. Abe et al.: J. Chem. Soc., Chem. Commun., 1736 (1989). These polyanilines are however practically insoluble in other general organic solvents so that their application field is limited.

Furthermore, polyanilines soluble in organic solvents have been synthesized utilizing various kinds of aniline derivatives, but they are not able to form films having sufficient elasticity.

On the other hand, it has been known that high molecular compounds can be processed by techniques such as gel drawing, gel spinning, gel molding, etc., if they are gelatinizable.

SUMMARY OF THE INVENTION

The present invention has been completed in the light of the above described circumstances in the prior arts.

An object of the present invention is therefore to provide a novel graft polyaniline derivative, which is soluble or gelatinizable in general organic solvents and is capable of forming self-standing films or fibers having good elasticity.

Another object of the present invention is to provide a process for producing the novel graft polyaniline derivatives.

The present inventors have carried out an extensive investigation with a view toward overcoming the problems described above. As a result, it has been found that polyaniline derivatives having a graft structure which are soluble in organic solvents and capable of forming self-standing films having good elasticity can be produced by reacting a reduced polyaniline with a polyether compound having a functional terminal group capable of reacting with aromatic secondary amines, leading to the completion of the present invention.

The polyaniline derivative according to the present invention is represented by the following formula (I) having a quinodiimine unit structure, an imino-1,4-phenylene unit structure and a N-polyether chain substituted imino-1,4-phenylene unit structure bonding at random one another,

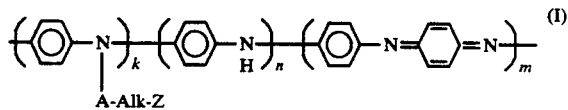

wherein k is an integer of at least 1, m and n each is zero or an integer of at least 1, k+m+n=10 to 5,000, m/(n+m)=0 to 1, Alk stands for a polyether chain having a number average molecular weight of 100 to 100,000 and having oxygen atoms at the both terminals, A denotes a linking group selected from the group consisting of the following formula (1)-(9),

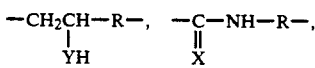

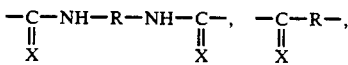

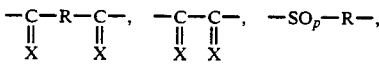

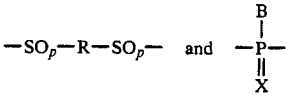

wherein R is a divalent hydrocarbon group having 1 to 30 carbon atoms which may be substituted with a halogen atom or COOM, wherein M is a hydrogen atom, Li, Na, K, Cs, Rb or $NH_4$, X denotes an oxygen atom or a sulfur atom, Y denotes an oxygen atom, a sulfur atom or —NH—, B denotes a hydrocarbon group having 1 to 30 carbon atoms or an alkoxy group having 1 to 30 carbon atoms, and p is 0 or an integer of 1 or 2, and Z denotes a hydrogen atom, a hydrocarbon group having 1 to 30 carbon atoms, $R^1C(=O)—$ or $R^1 OC(=O)CH_2—$, wherein $R^1$ is a hydrogen atom, an alkyl group having 1 to 30 carbon atoms, an alkenyl group, a benzyl group or an aryl group which may be substituted.

The process for producing the polyaniline derivative of the present invention comprises a step of treating a polymer obtained by oxidatively polymerizing aniline with ammonia to prepare a soluble polyaniline, a step of treating the soluble polyaniline with excess hydrazine to prepare a reduced polyaniline having a number average molecular weight of 2,000 to 500,000 composed of an imino-1,4-phenylene unit structure, and a step of reacting the reduced polyaniline with a polyether compound represented by the following formula (II) having a functional group capable of reacting with aromatic secondary amines at its terminal:

wherein W is a functional group selected from the group consisiting of the following formulas (a)–(g)

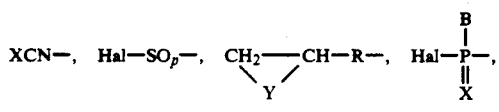

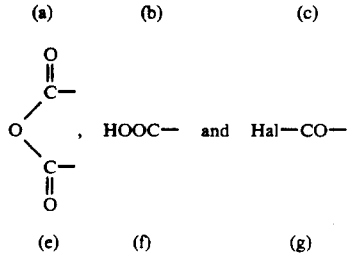

wherein Hal denotes a halogen atom, X, Y, B and p have each the same meaning as described above, $A^1$ denotes a direct bond, a divalent hydrocarbon group having 1 to 30 carbon atoms which may be substituted with halogen atoms, $-R-C(=X)-$, $-R-NHC(=X)-$, $-R-SO_p-$ or $-C(=X)-$, wherein R and X have each the same meaning as described above, but $A^1$ is a trivalent hydrocarbon group having 1 to 30 carbon atoms when W denotes an internal carboxylic anhydride group (e), and Alk and Z have each the same meaning as described above.

DETAILED DESCRIPTION OF PREFERRED EMBODIMENTS

The present invention will hereinafter be described in detail.

The polyaniline derivatives of the present invention are characterized by having a N-polyether chain substituted imino-1,4-phenylene unit structure represented by the following formula (III):

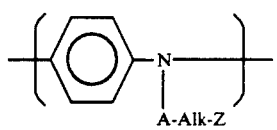

wherein A, Alk and Z have each the same meaning as described above.

In the present invention, the number of nitrogen atoms which take part in the graft structure represented by the above formula (III) is preferably in a range of from 0.01 to 100% based on a total of nitrogen atoms in the polyaniline chain when the linking group represents the formula (1), and from 0.01 to 40% chain when the linking group represents one of the formulas (2)–(9). If the number of nitrogen atoms is beyond the above described range, the produced polyaniline derivative causes a problem of decreasing electrical conductivity thereof. If the number of nitrogen atoms is lower than the above described range, the produced polyaniline derivative become difficult to dissolve or swell in organic solvents and solubility thereof is hardly different from that of polyaniline.

In the unit structure represented by the above formula (III), the linking group A, which is selected from the group consisting of the formulas (1)–(9), has no influence upon properties including solubility and film formability of the polyaniline derivative of the present invention. In the linking group, R in the formulas (1)–(5), (7) and (8) represents a divalent hydrocarbon group having 1-30 carbon atoms which may be substituted by halogen atoms or COOM; and examples of it are those selected from straight-chain or branched-chain divalent aliphatic hydrocarbon groups having 1-30 carbon atoms, aromatic aliphatic hydrocarbon groups and aromatic hydrocarbon groups, which may be substituted with halogen atoms or carboxyl groups Alk represents a polyether chain having oxygen atoms at the both terminals, which has an average molecular weight of from 100 to 100,000. Examples of the polyether chain include those composed of at least one unit structure selected from oxymethylene, oxyethylene, oxypropylene, oxytrimethylene, oxytetramethylene, oxypentamethylene, oxyhexamethylene, oxymethylmethylene, oxymethylethylene, oxymethoxymethylethylene, oxyphenoxymethylmethylene, oxyethylethylene, oxy-$C_3$-$C_{30}$ alkylethylene, oxy-2-methyltrimethylene and oxy-2-methyl-tetramethylene, etc.

In the functional group Z, examples of the hydrocarbon group having 1-30 carbon atoms include alkyl groups, alkenyl groups, benzyl group and aryl groups.

Examples of the graft structure represented by the formula (III) include groups represented by the following formulas (III-1)–(III-8):

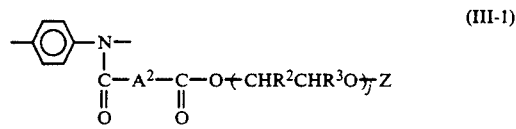

(III-1)

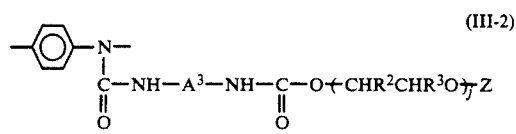

(III-2)

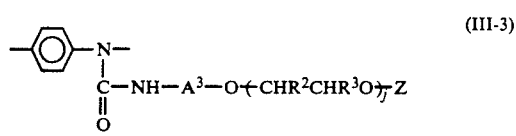

(III-3)

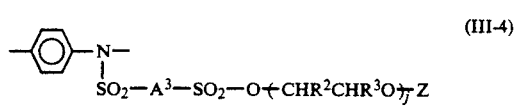

(III-4)

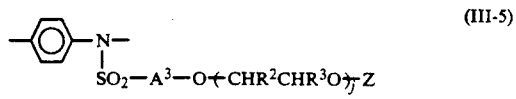

(III-5)

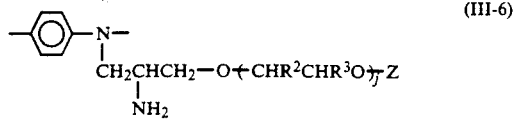

(III-6)

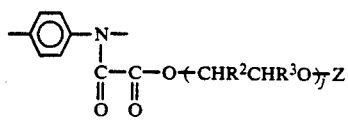
(III-7)

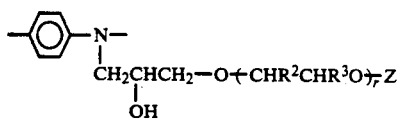
(III-8)

wherein $A^2$ denotes an alkylene group having 1-4 carbon atoms, an alkenylene group having 1-4 carbon atoms, or a 1,2-phenylene group, $A^3$ denotes an alkylene group having 1-6 carbon atoms or a phenylene group, $R^2$ and $R^3$ are each a hydrogen atom or an alkyl group having 1-5 carbon atoms, j is an integer of 6-200, r is an integer of 2-200, and Z has the same meaning as described above.

The polyaniline derivative of the present invention can be produced in the following manner. Namely, polyaniline prepared by oxidative polymerization of aniline using ammonium persulfate or the like as an oxidizing agents at a low temperature, for example, in a range of from $-20°$ to $50°$ C. is first treated with ammonia to convert it to a soluble polyaniline. The thus obtained soluble polyaniline is then treated with excess hydrazine to prepare a reduced polyaniline having a number average molecular weight of 2,000 to 500,000 (as measured by GPC in N-methyl-2-pyrrolidone as a solvent and converted relative to polystyrene). The hydrazine treatment can be effected by dispersing the soluble polyaniline in water or methanol, adding hydrazine in an amount of at least equivalent to, preferably three times the nitrogen atoms in the polyaniline in a nitrogen atmosphere and then stirring the resultant mixture at $0°-30°$ C. for more than 24 hours.

The reduced polyaniline thus obtained is soluble in the following amide solvents. Namely, it is soluble in N-methyl-2-pyrrolidone, N,N-dimethylacetamide, N,N-dimethylformamide, hexamethylphosphoric triamide and 1,3-dimethyl-2-imidazolidinone. It is however practically insoluble in other general organic solvents, for example, chloroform and tetrahydrofuran.

In the present invention, if the number average molecular weight of the main polymer chain of the above described polyaniline is less than 2,000, it becomes difficult to produce elastic self-standing films and fibers from the finally produced polyaniline derivative. If it is beyond 500,000, the finally produced polyaniline has neither sufficient solubility nor gelatinizability in solvents, whereby it is not preferred in view of processability such as casting, gel extrusion, etc.

In order to introduce the graft structure into the reduced polyaniline, a polyether compound having a functional group (W) capable of reacting with aromatic secondary amines at its terminal is used.

What the present invention is aiming at is introduction of a suitable polyether chain as the branched chain into the main polymer chain of the polyaniline. In the present invention, the structure of the linking group A between the polyether chain and the main polymer chain of polyaniline has not any influence on properties, including solubility and film-formability, of the polyaniline derivatives of the present invention. Therefore, it is sufficiently used for preparing the polyaniline derivative of the present invention, if one terminal of the above polyether compound prior to the reaction have a functional group capable of reacting with aromatic secondary amine.

Examples of the terminal functional group W in the polyether compounds represented by the above formula (II) include isocyanate group, isothiocyanate group, sulfinyl halide group, sulfenyl halide group, sulfonyl halide group, oxirane group, aziridine group, thiirane group, phosphinyl halide group, thiophosphinyl halide group, carboxyl group, haloformyl group and internal carboxylic anhydride group (e).

Examples of Alk and Z include the same groups as those described above.

Exemplary, the polyether compounds represented by the above formula (II) having a functional group capable of reacting with aromatic secondary amines at their terminal include those which are prepared by cationic polymerization, anionic polymerization or coordination polymerization of cyclic ethers and converting then a terminal hydroxyl group of the resultant polyether having at least a hydroxyl group at its terminal into the functional group capable of reacting with aromatic secondary amines.

The polyether compounds are prepared using polyethers having a terminal hydroxyl group, such as poly(oxyethylene) cetyl ether, poly(oxyethylene) lauryl ether, poly(oxymethylene) methyl ether, poly(oxyethylene) methyl ether, poly(oxyethylene) laurate, poly(oxyethylene) stearate and the like, as starting materials. Examples of such polyether compounds include those having a cyclic internal acid anhydride group at its terminal which are prepared by reacting said starting materials with trimellitic acid anhydride or trimellitic anhydride halide, those having a terminal isocyanate group which are obtained by reacting with excess diisocyanate, those having a terminal isothiocyanate group which are obtained by reacting with excess diisothiocyanate, those having a terminal sulfinyl halide, sulfenyl halide or sulfonyl halide group which are prepared by reacting with disulfinyl halide, disulfenyl halide or disulfonyl halide, those having a terminal epoxy group which are prepared by reacting with halide compounds having an epoxy ring such as epihalohydrin, those having aziridine ring at their terminal which are prepared by reacting with a terminal double bond containing halogenated hydrocarbon such as allyl halide or a terminal double bond containing carboxylic acid such as allyl acetic acid and reacting the resultant polyether having a terminal double bond with INCO and then with KOH, and those having thiirane ring at the terminal which are prepared by reacting the above described polyether having a terminal double bond with sulfur dichloride and reducing the resultant product.

Further examples include polyether compounds prepared by reacting polyethyleneoxide having an amino group at its terminal with phosgene to convert the terminal into a terminal isocuanate group.

Exemplary, the polyether compounds represented by the formula (II) include polyethers having a carboxyl group at their terminal represented by the following formula (II-1) and polyethers having a haloformyl group at their terminal represented by the following formula (II-2).

(II-1)

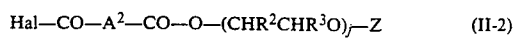
(II-2)

wherein $A^2$, Hal, $R^2$, $R^3$, Z and j have each the same meaning as described above.

The polyether compounds having a haloformyl group at their terminal represented by the above formula (II-2) are easily produced using the polyther compounds having a carboxyl group at their terminal represented by the above formula (II-1), alkyl esters, alkali metal salts or ammonium salts thereof.

In greater detail, when the carboxylic acid represented by the formula (II-1) is used as a starting material, it is allowed to react with an equimolecular amount or more of inorganic halide compounds such as phosphonyl chloride, thionyl chloride, phosphorus pentachloride, phosphorus trichloride, etc, in an inert solvent such as benzene, by which the polyether compound having a haloformyl group at its terminal can be produced. In this case, it is possible to add zinc chloride, pyridine, iodine or triethylamine as a catalyst. Alternatively, the above described carboxylic acid may be allowed to react with organic halide compounds, for example, acid halides such as benzoyl chloride, phthaloyl chloride, oxalyl chloride, etc., organic halogenides such as α, α-dihalogenoether, halogenated alkylamines, triphenylphosphine/carbon tetrachloride, and organic phosphohalides such as pyrocatechylphosphotrichloride, diethyl halophosphochloride, triphenyl halophosphobromide, etc. in an inert organic solvent such as benzene or chlorobenzene, etc.

When the carboxylic acid alkyl ester represented by the formula (II-1) is used as a starting material, it is allowed to react with triphenyl halophosphobromide or a complex thereof with boron fluoride to obtain the polyether compounds having a haloformyl group at its terminal.

When the carboxylic acid alkali metal or ammonium salt is used as a starting material, it is allowed to react with an inorganic halide such as phospholyl chloride or phosphorus pentachloride etc., or a complex of thionyl chloride and dimethylformamide to obtain the polyether compounds having a haloformyl group at its terminal.

Further examples of the polyether compounds used in the present invention represented by the formula (II) include polyethers having a glycidyl group at their terminal represented by the following formula (II-3).

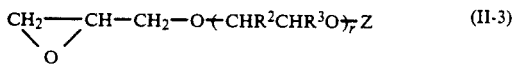
(II-3)

wherein $R^2$, $R^3$, Z and r have each the same meaning as described above.

Polyethers having a glycidyl group at theri terminal can be easily derived from polyethers having a hydroxyl group at their terminal represented by the formula (IV)

(IV)

wherein $R^2$, $R^3$, Z and r have each the same meaning as described above.

For example, they can be synthesized according to the Williamson ether synthesis. Namely, the above polyether having a hydroxyl group at its terminal is dissolved in tetrahydrofuran, and it is allowed to react with alkali metal such as sodium at room temperature for 1-2 hours to form alkali metal alkoxide (for example, sodium alkoxide). To the reaction mixture, epichlorohydrin or epibromohydrin is added, followed by reacting at 20°-60° C. for 3-6 hours. After removal of alkali metal salts from the resulted mixture, the mixtutre is treated with ether to precipitate a polyether having a glycidyl group at its terminal. The precipitate is dissolved in chloroform and reprecipitated with ether to obtain the polyether compound represented by the formula (II-3). In this case, alkali hydride such as sodium hydride may be used in place of alkali metal.

Alternatively, a polyether having a hydroxyl group at its terminal represented by the formula (IV) is allowed to react with epichlorohydrin or epibromohydrin in the presence of a protonic acid such as sulfuric acid or hydrochloric acid to cause ring-openning reaction. Then, it is treated in the presence of alkali such as sodium hydroxide or potassium hydroxide to cause ring closing reaction, followed by purifying by the same manner to obtain a polyether compound represented by the above formula (II-3).

The other examples of the polyether compounds represented by the formula (II) using in the present invention include compounds represented by the following formulas (II-4)-(II-11).

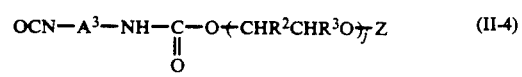
(II-4)

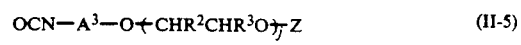
(II-5)

(II-6)

(II-7)

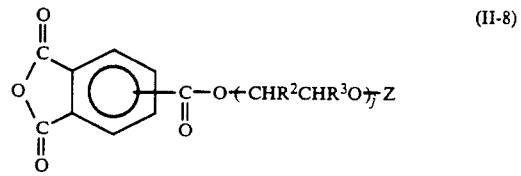
(II-8)

(II-9)

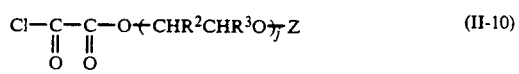
(II-10)

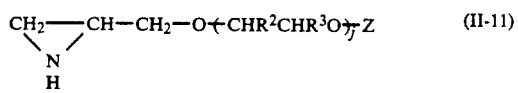
(II-11)

In the following, the process for reaction the reduced polyaniline produced as described above with the polyether compound represented by the formula (III) having a functional group capable of reacting with aromatic secondary amines at its terminal is explained in detail. In the process of the present invention, the reaction conditions differ depending upon the kind of funcional group W.

1) In the case of the functional group W being the formulas (a)-(e):

To a solution of the above described reduced polyaniline in an amide solvent, a solution prepared by dissolving the polyether compound having a functional group capable of reacting with aromatic secondary amines at its terminal was added, followed by stirring at −10°-80° C. for 1-48 hours under a nitrogen atmosphere. The reaction may be conducted, if necessary, by adding pyridine, tertiary amine such as triethylamine or diethylaniline, or ammonium chloride. The reaction mixture was poured into alcohol or water to precipitate a polymer. The resultant polymer is further treated with aqueous ammonia to produce a polyaniline derivative of the present invention.

2) In the case of the functional group W being the formula (f):

Into a solution of the polyether compound having a carboxyl group at its terminal in an amide solvent, a N,N'-substituted carbodiimide is added in an amount of at least equivalent to the terminal carboxyl group with chilling at $-10°$-$10°$ C., followed by stirring at the same temperature for 1–4 hours. Into the solution, the reduced polyaniline was slowly added. The mixture is further stirred for 1–6 hours while the temperature is slowly raised to room temperature. After conclusion of the reaction, the reaction mixture is poured into diluted hydrochloric acid to precipitate a polyaniline derivative. Since the resultant polyaniline derivative has been doped with hydrochloric acid, it is subjected to undoping treatment by exposing to ammonia gas and washing with water, whereby a polyaniline derivative of this invention is obtained.

N,N'-disubstituted carbodiimide used in this process is represented by the following formula (V).

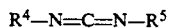

$$R^4-N=C=N-R^5 \quad (V)$$

wherein $R^4$ and $R^5$ which may be identical or different represents each a substituted or nonsubstituted alkyl group such as methyl group, ethyl group, n-propyl group, i-propyl group, n-butyl group, t-butyl group, 3-dimethylaminopropyl group, etc., cycloalkyl group such as cyclohexyl group, or a substituted or nonsubstituted aryl group such as phenyl group, p-tolyl group, m-tolyl group, p-N,N-dimethylaminophenyl group, p-chlorophenyl group, p-nitrophenyl group, p-cyanophenyl group, etc.

Examples of them include diethylcarbodiimide, diisopropylcarbodiimide, dicyclohexylcarbodiimide, diphenylcarbodiimide, di-p-tolylcarbodiimide, 1-ethyl-3-(3-dimethylaminopropyl)carbodiimide and the like.

In the above process, it is preferred that the amount of N,N'-disubstituted carbodiimide used is at least equivalent to the terminal carboxyl group of the polyether compound.

3) In the case of the functional group W being the formulas (g):

A solution prepared by dissolving a polyether compound having a haloformyl group at its terminal in a solvent (for example, chloroform which is miscible with amide solvents and is inert to haloformyl group) is added dropwise to a solution of the above described reduced polyaniline in an amide solvent, followed by stirring at $0°$-$80°$ C. for 1–10 hours under a nitrogen atmosphere. The reaction mixture is then poured in diluted hydrochloric acid to precipitate a polyaniline derivative. Since the resultant polyaniline derivative has been doped with hydrochloric acid, it is subjected to undoping treatment by exposing to ammonia gas and washing with water to produce a polyanailine derivative of the present invention.

Examples of amide solvents used in the above described reactions of 1)-3) of the present invention include N-methyl-2-pyrrolidone, N,N-dimethylacetamide, N,N-dimethylformamide, hexamethylphosphoric triamide, 1,3-dimethyl-2-imidazolidinone and the like.

In the process of the present invention, because length of the main polymer chain of the polyaniline does not vary during the reaction, the degree of polymerization of the resultant polyaniline derivatives of the present invention becomes the same as that of the reduced polyaniline used as the starting material. The value of $m/(n+m)$ of the polyaniline derivatives of the present invention can be controlled in a range of from 0 to 1 by oxidation or reduction of the resulted polyaniline derivatives. Namely, the value of m increases, if the polyaniline derivative of the present invention is oxidized electrochemically or using an oxidizing agent, while the value of m decreases, if the polyaniline derivative of the present invention is reduced electrochemically or using a reducing agent. However, regarding solubility in solvents, $m<n$ is preferred because the ratio of rigid quinodiimine structure increases. On the other hand, regarding self-standing property or elasticity of the films, $m>n$ is preferred. Therefore, the preferred value of $m/(n+m)$ is in a range of from 0.1 to 0.6 in case of forming films.

The value of $m/(n+m)$ can be determined from a ratio of strength of the peak (chemical shift 138 ppm/TMS) assigned to quinoid structure to that of the peak (chemical shift 122 ppm/TMS) assigned to benzenoid structure in $^{13}C$ NMR spectroscopy.

The polyaniline derivatives of the present invention produced as described above are capable of dissolving in polar solvents, for example, amide solvents such as N-methyl-2-pyrrolidone, N,N-dimethylacetamide and the like, halogenated hydrocarbon solvents such as chloroform, dichloroethane, dichloromethane and the like, ether solvents such as tetrahydrofuran and the like, amine solvents such as pyridine and the like and dimethylsulfoxide, etc. Using a solution of the polyaniline in one of these solvents, good self-standing films of fibers can be produced. The films or fibers so formed show conductivity as high as $10^{-3}$–50 S/cm after having been doped with an acceptor dopant.

Any dopant may be used, if it can be used for producing conductive aniline polymers by doping. Examples of the dopants include halogenated compound such as iodine, bromine, chlorine, iodine trichloride, protonic acids such as sulfuric acid, hydrochloric acid, nitric acid, perchloric acid, fluoroboric acid and salts of said protonic acids, Lewis acids such as aluminium trichloride, ferric trichloride, molybdenum chloride, antimony chloride, arsenic pentachloride, etc., organic acids such as acetic acid, trifluoroacetic acid, benzenesulfonic acid, p-toluenesulfonic acid etc, high polymer acids such as poly(ethylene sulfonic acid), polyethylene carbonic acid, polyacrylic acid, polystyrene sulfonic acid, etc.

Any known method can be used for doping with the above described compounds. In general, doping can be conducted by bringing the polyaniline derivative, gelatinized or molded products thereof in contact with the dopant in gas phase or liquid phase. Alternatively, it is possible to use a method of electrochemically doping with the above described protonic acids or salts thereof in a solution.

The polyaniline derivatives of the present invention are soluble or gelatinizable in various organic solvents, thereby elastic self-standing films or fibers being formed easily. Further, they may be utilized in various uses, for example, electronic materials, conductive materials and the like because of showing a high conductivity after having been doped.

EXAMPLES

The present invention will hereinafter be described by following examples.

EXAMPLE 1

4.1 g of aniline and 12.9 g of concentrated hydrochloric acid were dissolved in water to give 100 ml of an aniline solution. The aniline solution was chilled to $-10°$ C. On the other hand, 21.9 g of concentrated hydrochloric acid and 6.28 g of ammonium persulfate were also dissolved in water to give 100 ml of a solution. The latter solution was also chilled to $-10°$ C. and was then slowly added dropwise to the aniline solution, followed by stirring at $-10°$ C. for 6 hours. The thus obtained polyaniline having a number average molecular weight of 12,000 (GPC in N-methyl-2-pyrrolidone as a solvent and converted relative to polystyrene) was washed thoroughly with water, followed by undoping treatment with aqueous ammonia.

The resultant soluble polyaniline was dispersed in 200 ml of water, followed by the addition of 50 ml of hydrazine in a nitrogen atmosphere. The mixture thus obtained was continuously stirred for 24 hours at room temperature. The resultant solid precipitate was collected by filtration and then dried, whereby a reduced polyaniline (number average molecular weight: 12,000) of a grayish white color was obtained.

On the other hand, as a polyether having a carboxyl group at its terminal, 0.825 g of poly(oxyethylene) diglycollic acid monomethyl ester (average molecular weight: about 3000, chemical formula: $HOOCCH_2-O-(CH_2CH_2O)_j-CH_2CO_2CH_3$; j=about 65) was dissolved in 10 ml of dryed benzene. To the solution was added 1 ml of oxalyl chloride. The reaction system was heated to 50° C. for 2 hours and then to 80° C. for 1 hour, followed by removing benzene and oxalyl chloride by distillation to Obtain 0.830 g of a polyether having a chloroformyl group at its terminal (2.5% of chloroformyl group based on nitrogen atoms in the polyaniline). The presence of chloroformyl group was confirmed by the fact that an absroption at $1795 \text{ cm}^{-1}$ was recognized and an absroption at $1770 \text{ cm}^{-1}$ of carboxylic acid disappeared.

A solution prepared by dissolving the resultant polyether in 10 ml of dehydrated chloroform was added dropwise to a solution prepared by dissolving 1 g of the above described reduced polyaniline in 50 ml of N-methyl-2-pyrrolidone, followed by reacting at room temperature for 4 hours with stirring. After conclusion of the reaction, the reaction mixture was added to 1 liter of diluted hydrochloric acid with stirring, and the resultant precipitate was collected by filtration. After it was allowed to stand in an atmosphere of ammonia gas, it was washed with water to remove hydrogen halide, followed by drying to obtain 1.820 g of a branched polyaniline derivative of the present invention (k+m+n=about 98).

When the resultant branched polyaniline derivative was analyzed by infrared absorption spectroscopy, absorptions at $1650 \text{ cm}^{-1}$ ($C=O$ stretching) and $2850-2950 \text{ cm}^{-1}$ (aliphatic C—H stretching) assigned to the graft structure represented by the above formula (III) were observed. Moreover, absorptions at 1600, 1500, 1300, 1170 and $820 \text{ cm}^{-1}$ assigned to the polyaniline structure were observed, whereby the main polymer chain of the branched polyaniline derivative was confirmed to have a polyaniline structure.

From the yield Of the reaction, the number of nitrogen atoms taking part in graft structure represented by the formula (III) was found to be about 2.5% of the total number of nitrogen atoms contained in the polyaniline chain. ($k/(k+2m+n)=0.025$). $^{13}C$ NMR spectrum revealed $m/(n+m)=0.33$.

The resultant branched polyaniline dissolved by stirring 1 g thereof in 5 g of N-methyl-2-pyrrolidone at room temperature. From the resultant solution, a self-standing film was obtained by casting. Its conductivity was 0.5 S/cm after having been doped by immersing it in a 20% aqueous sulfuric acid for 24 hours.

The branched polyaniline derivative was also soluble in organic solvents such as N,N-dimethylacetamide, N,N-dimethylformamide, pyridine, chloroform, dichloroethane, dichloromethane and tetrahydrofuran in in place of N-methyl-2-pyrrolidone, and it was therefore processible. The branched polyaniline derivative was also soluble in water or alcohols such as methaol and ethanol.

EXAMPLE 2

A branched polyaniline derivative (k+m+n=about 100) was obtained in a yield of l.780 g in a similar manner to Example 1 except that 0.812 g of succinic acid mono-(polyethyleneglycol monolaurylate) ester [molecular weight: about 740, j=about 10 in the formula (II-1)] was used in lieu of the polyether having a carboxyl group at its terminal in Example 1. The resultant branched polyaniline derivative was soluble in the same organic solvents as those in Example 1 and also soluble in water and alcohols. It is therefore processible.

When the resultant branched polyaniline derivative was analyzed by infrared absorption spectroscopy, absorptions at $1650 \text{ cm}^{-1}$ ($C=O$ stretching) and $2850-2950 \text{ cm}^{-1}$ (aliphatic C—H stretching) assigned to the graft structure represented by the above formula (III) were observed. Moreover, absorptions at 1600, 1500, 1300, 1170 and $820 \text{ cm}^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 10% of the total number of nitrogen atoms contained in the polyaniline chain. ($k/(k+2m+n)=0.1$). $^{13}C$ NMR spectrum revealed $m/(n\ m)=0.34$.

The resultant branched polyaniline dissolved by stirring 1 g thereof in 5 g of N-methyl-2-pyrrolidone at room temperature. From the resultant solution, a self-standing film was obtained by casting. Its conductivity was 0.5 S/cm after having been doped by immersing it in a 20% aqueous sulfuric acid for 24 hours.

EXAMPLE 3

A branched polyaniline derivative (k+m+n=about 99) was obtained in a yield of 1.790 g in a similar manner to Example 1 except that 0.812 g of succinic acid mono-(polyethyleneglycol monolaurylate) ester [molecular weight: about 1386, j=about 25 in the formula (II-1)] was used in lieu of the polyether having a carboxyl group at its terminal in Example 1. The resultant branched polyaniline derivative was soluble in the same organic solvents as those in Example 1 and also soluble in water and alcohols. It is therefore processible.

When the resultant branched polyaniline derivative was analyzed by infrared absorption spectroscopy, absorptions at 1650 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 5% of the total number of nitrogen atoms contained in the polyaniline chain. (k/(k+2m+n)=0.05). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 0.5 S/cm after having been doped by immersing it in a 20% aqueous sulfuric acid for 24 hours.

EXAMPLE 4

A branched polyaniline derivative (k+m+n=about 104) was obtained in a yield of 2.10 g in a similar manner to Example 1 except that 2.195 g of poly(oxyethylene) diglycollic acid monoethyl ester (average molecular weight: about 1000, chemical formula: HOOCCH$_2$—O—(CH$_2$CH$_2$O)$_j$—CH$_2$CO$_2$C$_2$H$_5$; j=about 20) was used in lieu of the polyether having a carboxyl group at its terminal in Example 1. The resultant branched polyaniline derivative was soluble in the same organic solvents as those in Example 1 and also soluble in water and alcohols. It is therefore processible.

When the resultant branched polyaniline derivative was analyzed by infrared absorption spectroscopy, absorptions at 1650 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 20% of the total number of nitrogen atoms contained in the polyaniline chain. (k/(k+2m+n)=0.2). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 0.07 S/cm after having been doped by immersing it in a 20% aqueous sulfuric acid for 24 hours.

EXAMPLE 5

2.195 g of polyethylene diglycollic acid monoethyl ester (average molecular weight: about 1000, chemical formula: HOOCCH$_2$—O—(CH$_2$CH$_2$O)$_j$—CH$_2$CO$_2$C$_2$H$_5$; j=about 20) was used as a polyether having a carboxyl group at its terminal and was dissolved in 30 ml of N-methyl-2-pyrrolidone under a nitrogen atmosphere, and the resultant solution was chilled to 0° C.

To the solution was added 0.453 g of dicyclohexylcarbodiimide, followed by stirring at 0° C. for 1 hour. After addition of 1 g of the reduced polyaniline prepared in Example 1, the mixture was allowed to react for 6 hours, while the temperature thereof lowered slowly to room temperature. After conclusion of the reaction, the resultant reaction mixture was poured into 1 litter of diluted hydrochloric acid with stirring, and the resultant precipitate was collected by filtration. After it was allowed to stand in an atmosphere of ammonia gas, it was washed with water to remove hydrogen halide, followed by drying to obtain 3.082 g of a branched polyaniline derivative of the present invention (k+m+n=about 104). The resultant branched polyaniline derivative was soluble in the same organic solvents as those in Example 1 and also soluble in water and alcohols. It was therefore processible.

When the resultant branched polyaniline derivative was analyzed by infrared absorption spectroscopy, absorptions at 1650 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 20% of the total number of nitrogen atoms contained in the polyaniline chain. (k/(k+2m+n)=0.2). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 0.05 S/cm after having been doped by immersing it in a 20% aqueous sulfuric acid for 24 hours.

EXAMPLE 6

Poly(oxyethylene) diglycollic acid monoethyl ester (average molecular weight: about 1000, chemical formula: HOOCCH$_2$—O—(CH$_2$CH$_2$O)$_j$—CH$_2$COC$_2$H$_5$; j=about 20) was used as a polyether having a carboxyl group at its terminal, 4.395 g of which were dissolved in 30 ml of N-methyl-2-pyrrolidone under a nitrogen atmosphere, and the resultant solution was chilled to 0° C.

To the solution was added 0.906 g of dicyclohexylcarbodiimide, followed by stirring at 0° C. for 1 hour. After 1 g of the reduced polyaniline prepared in Example 1 was added, the mixture was allowed to react for 6 hours, while the temperature thereof lowered slowly to room temperature. After conclusion of the reaction, the resultant reaction solution was poured into 1 litter of diluted hydrochloric acid with stirring, and the resultant precipitate was collected by filtration. After it was allowed to stand in an atmosphere of ammonia gas, it was washed with water to remove hydrogen halide, followed by drying to obtain 5.22 g of a branched polyaniline derivative of the present invention (k+m+n=about 110). The resultant branched polyaniline derivative was soluble in the same organic solvents as those in Example 1 and also soluble in water and alcohols.

When the resultant branched polyaniline derivative was analyzed by infrared absorption spectroscopy, absorptions at 1650 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 40% of the total number of nitrogen atoms contained in the polyaniline chain. (k/(k+2m+n)=0.4). $^{13}$C NMR spectrum revealed m/(n+m)=0.35.

The resultant branched polyaniline dissolved by stirring 1 g thereof in 5 g of N-methyl-2-pyrrolidone at room temperature. From the resultant solution, a self-standing film was obtained by casting. Its conductivity was 0.01 S/cm after having been doped by immersing it in a 20% aqueous sulfuric acid for 24 hours.

EXAMPLE 7

4.1 g of aniline and 12.9 g of concentrated hydrochloric acid were dissolved in water to give 100 ml of an aniline solution. The aniline solution was chilled to −10° C. On the other hand, 21.9 g of concentrated hydrochloric acid and 6.28 g of ammonium persulfate were also dissolved in water to give 100 ml of a solution. The latter solution was also chilled to −10° C. and was then slowly added dropwise to the aniline solution, followed by stirring at −10° C. for 6 hours. The thus obtained polyaniline having a number average molecular weight of 12,000 (GPC in N-methyl-2-pyrrolidone as a solvent and converted relative to polystyrene) was washed thoroughly with water, followed by undoping treatment with aqueous ammonia.

The resultant soluble polyaniline was dispersed in 200 ml of water, followed by the addition of 50 ml of hydrazine in a nitrogen atmosphere. The mixture thus obtained was continuously stirred for 24 hours at room temperature. The resultant solid precipitate was collected by filtration and then dried, whereby a reduced polyaniline (number average molecular weight: 12,000) of a grayish white color was obtained.

On the other hand, a polyether having an acid anhydride group at its terminal was synthesized by reacting polyethyleneglycol monomethyl ether (average molecular weight: about 2000, produced by Aldrich Co.) with an equimolecular amount of trimellitic acid anhydride chloride in tetrahydrofuran to conduct esterification.

To a solution prepared by dissolving 1 g of the above described reduced polyaniline in 30 ml of N-methyl-2-pyrrolidone was added 2.39 g of the polyether having an acid anhydride group at its terminal, and the resulted mixture was allowed to reacted at room temperature for 6 hours. After conclusion of the reaction, the reaction solution was added to 1 liter of diluted hydrochloric acid with stirring, and the resultant precipitate was collected by filtration. After it was allowed to stand in an atmosphere of ammonia gas, it was washed with water to remove hydrogen halide, followed by drying to obtain 3.38 g of a branched polyaniline derivative of the present invention (k+m+n=about 103).

When the resultant branched polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 10% of the total number of nitrogen atoms contained in the polyaniline chain. (k/(k+2m+n)=0.1). $^{13}$C NMR spectrum revealed m/(n+m)=0.30.

The resultant branched polyaniline dissolved by stirring 1 g thereof in 5 g of N-methyl-2-pyrrolidone at room temperature. From the resultant solution, a film was obtained by spining or extrusion. Its conductivity was 0.2 S/cm after having been doped by immersing it in a 20% aqueous hydrochloric acid for 24 hours.

Further, the branched polyaniline derivative was also soluble in organic solvents such as N,N-dimethylacetamide, N,N-dimethylformamide, pyridine, chloroform, dichloroethane, dichloromethane and tetrahydrofuran in place of N-methyl-2-pyrrolidone, and it was therefore processible.

EXAMPLE 8

Polyethyleneglycol monomethyl ether (average molecular weight: about 2000, produced by Aldrich Co.) was allowed to react with an equimolecular amount of hexamethylenediisocyanate to form a carbamic acid ester, by which a polyether having an isocyanate group at its terminal was prepared.

1.19 g of thus obtained polyether having an isocyanate group at its terminal was processed by means of the same manner as in Example 7 to obtain 2.17 g of a branched polyaniline derivative (k+m+n=about 99). The resultant branched polyaniline derivative was soluble in the same organic solvents as those in Example 7 and it was therefore processible.

When the resultant branched polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 4.8% of the total number of nitrogen atoms contained in the polyaniline chain. (k/(k+2m+n)=0.048). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a film were obtained by spinning or casting. Its conductivity was 1.2 S/cm after having been doped by immersing it in a 20% hydrochloric acid for 24 hours.

EXAMPLE 9

Polyethyleneglycol monomethyl ether (average molecular weight: about 5000, produced by Aldrich Co.) was allowed to react with an equimolecular amount of m-benzenedisulfonyl chloride to form a sulfonic acid ester, by which a polyether having a sulfonyl chloride group at its terminal was prepared.

0.57 g of the polyether having a sulfonyl chloride group at its terminal was processed by means of the same manner as in Example 7 to obtain 1.51 g of a branched polyaniline derivative (k+m+n=about 98). The resultant branched polyaniline derivative was soluble in the same organic solvents as those in Example 7 and it was therefore processable.

When the resultant branched polyaniline derivative was analyzed by infrared absorption spectroscopy, absorptions at 1351, 1176 cm$^{-1}$ (S=O stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 1.0 % of the total number of nitrogen atoms contained in the polyaniline chain. (k/(k+2m+n)=0.01). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a film were obtained by spinning or casting. Its conductivity was 1.1 S/cm after having been doped by immersing it in a 20% hydrochloric acid for 24 hours.

EXAMPLE 10

Polyethyleneglycol monododecyl ether (molecular weight: 1288, produced by Tokyo Kasei Co.) was allowed to react with 1.5 times by mol of sodium hydride, followed by reacting with 2 times by mol of allyl chloride to change its terminal to an allyl group. The product was then allowed to react with INCO at room temperature for 24 hours, followed by refluxing in methanol for 3 hours. After addition of KOH, the mixture was refluxed for 4 hours to convert the terminal allyl group into an aziridine group.

5.97 g of thus obtained polyether having an aziridine group at its terminal was processed by the same manner as in Example 7 to obtain 6.51 g of a branched polyaniline derivative (k+m+n=about 109). The resultant branched polyaniline derivative was soluble in the same organic solvents as those in Example 7 and it was therefore processable.

When the resultant branched polyaniline derivative was analyzed by infrared absorption spectroscopy, absorptions at 3360, 3290 cm$^{-1}$ (N—H stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 37.0% of the total number of nitrogen atoms contained in the polyaniline chain. (k/(k+2m+n)=0.37). $^{13}$C NMR spectrum revealed m/(n+m)=0.35.

The resultant branched polyaniline dissolved by stirring 1 g thereof in 5 g of N-methyl-2-pyrrolidone at room temperature. From the resultant solution, a film were obtained by spinning or casting. Its conductivity was 0.1 S/cm after having been doped by immersing it in a 20% hydrochloric acid for 24 hours.

EXAMPLE 11

Polyethyleneglycol monododecanoic acid ester (average molecular weight: about 655, produced by Tokyo Kasei Co.) was allowed to react with an equimolecular amount of trimellitic acid anhydride to conduct esterification, by which a polyether having an acid anhydride group at its terminal was prepared.

1.82 g of thus obtained polyether having an acid anhydride group at its terminal was processed by the same manner as in Example 7 to obtain 2.71 g of a branched polyaniline derivative (k+m+n=about 103). The resultant branched polyaniline derivative was soluble in the same organic solvents as those in Example 7 and it was therefore processable.

When the resultant branched polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 19.0% of the total number of nitrogen atoms contained in the polyaniline chain. (k/(k+2m+n)=0.19). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a film were obtained by spinning or casting. Its conductivity was 0.8 S/cm after having been doped by immersing it in a 20% hydrochloric acid for 24 hours.

EXAMPLE 12

Polyethyleneglycol monostearate (average molecular weight: about 725, produced by Tokyo Kasei Co.) was allowed to react with an equimolecular amount of trimellitic acid anhydride concuct esterification, by which a polyether having an acid anhydride group at its terminal was prepared.

1.97 g of the polyether having an acid anhydride group at its terminal was processed by means of the same manner as in Example 7 to obtain 2.91 g of a branched polyaniline derivative (k+m+n=about 103). The resultant branched polyaniline derivative was soluble in the same organic solvents as those in Example 7 and it was also processible.

When the resultant branched polyaniline derivative was analyzed by infrared absorption spectroscopy, absorptions at 1650 cm$^{-1}$ (C=O stretching) and 2850–2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 19.0 % of the total number of nitrogen atoms contained in the polyaniline chain. (k/(k+2m+n)=0.19). $^{13}$C NMR spectrum revealed m/(n+m)=0.34.

The thus obtained branched polyaniline dissolved by stirring 1 g thereof in 5 g of N-methyl-2-pyrrolidone at room temperature. From the resultant solution, a film were obtained by spinning or casting. Its conductivity was 0.7 S/cm after having been doped by immersing it in a 20% hydrochloric acid for 24 hours.

EXAMPLE 13

Polyethyleneglycol monononylphenyl ether (average molecular weight: about 440, produced by Tokyo Kasei Co.) was allowed to react with an equimolecular amount of hexamethylenediisocyanate to form a carbamic acid ester, by which a polyether having an isocyanate group at its terminal was prepared.

2.67 g of the polyether having an isocyanate group at its terminal was processed by means of the same manner as in Example 7 to obtain 3.57 g of a branched polyaniline derivative (k+m+n=about 110). The resultant branched polyaniline derivative was soluble in the same organic solvents as those in Example 7 and it was also processible.

When the resultant branched polyaniline derivative was analyzed by infrared absorption spectroscopy, absorptions at 1650 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 39.0% of the total number of nitrogen atoms contained in the polyaniline chain. (k/(k+2m+n)=0.39). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a film were obtained by spinning or casting. Its conductivity was 0.1 S/cm after having been doped by immersing it in a 20% hydrochloric acid for 24 hours.

EXAMPLE 14

Polyethyleneglycol monomethyl ether (average molecular weight: about 2000, produced by Aldrich Co.) was allowed to react with 1.5 times by mol of NaH and then with 4-chlorobutanesulfonic acid sodium salt to change its terminal to a butyryl sulfonate group. The product was then allowed to react with PCl$_5$, by which terminal hydroxyl group of the polyethyleneglycol monomethyl ether was converted into a butyryl sulfonyl chloride group. The conversion to sulfonyl chloride was confirmed by infrared absorptions at 1400 and 1180 cm$^{-1}$.

2.36 g of the resultant polyether was processed by the same manner as in Example 7 to obtain 3.06 g of a branched polyaniline derivative (k+m+n=about 101). The resultant branched polyaniline derivative was soluble in the same organic solvents as those in Example 7 and it was also processible.

When the resultant branched polyaniline derivative was analyzed by infrared absorption spectroscopy, absorptions at 1351, 1176 cm$^{-1}$ (S=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 9.1% of the total number of nitrogen atoms contained in the polyaniline chain. (k/(k+2m+n)=0.091). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 2.1 S/cm after having been doped by immersing it in a 20% aqueous hydrochloric acid for 24 hours.

EXAMPLE 15

Diol type polypropyleneglycol (molecular weight: 1000, produced by Wako Chemical Industries, LTD.) was refluxed in water for 12 hours in a presence of potassium carbonate using platinum-active charcoal as a catalyst to convert its terminals into carboxyl groups. The volumetric analysis showed the number of terminal carboxyl groups being 2.01. The resulted compound was allowed to react with 1.1 times by mol of methanol to convert it into methyl ester derivative. The resultant monomethyl ester derivative was separated by passing the reaction mixture through a silica gel column, followed by treating with excess oxalyl chloride to convert the terminal carboxyl group into a chloroformyl group.

1.1 g of the polypropyleneglycol monomethyl ether having a chloroformyl group at its terminal was processed by means of the same manner as in Example 7 to obtain 2.1 g of a branched polyaniline derivative (k+m+n=about 101). The resultant branched polyaniline derivative was soluble in the same organic solvents as those in Example 7 and it was also processible.

When the resultant branched polyaniline derivative was analyzed by infrared absorption spectroscopy, absorptions at 1650, 1734 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 10.0% of the total number of nitrogen atoms contained in the polyaniline chain. (k/(k+2m+n)=0.1). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 1.8 S/cm after having been doped by immersing it in a 20% aqueous hydrochloric acid for 24 hours.

EXAMPLE 16

2.2 g of polyethyleneglycol monononylphenyl eter (average molecular weight: 2000, produced by Tokyo Kasei Co.) were allowed to react with an excess amount of oxalyl chloride to obtain a polyether having a chlrorooxalyl group (Cl—C(=O)C(=O)—) at its terminal. The chlorooxalyl group was confirmed by infrared absorptions at 1790 and 1734 cm$^{-1}$ (C=O stretching).

The resulted polyether having a chlorooxalyloxy group at its terminal was processed by the same manner as in Example 7 to obtain 2.41 g of a branched polyaniline derivative (k+m+n=about 100). The resultant branched polyaniline derivative was soluble in the same organic solvents as those in Example 7 and it was also processible.

When the resultant branched polyaniline derivative was analyzed by infrared absorption spectroscopy, absorptions at 1650, 1734 cm$^{-1}$ (C=O stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 7.5% of the total number of nitrogen atoms contained in the polyaniline chain. (k/(k+2m+n)=0.075). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 1.5 S/cm after having been doped by immersing it in a 20% aqueous hydrochloric acid for 24 hours.

EXAMPLE 17

4.1 g of Aniline and 12.9 g of concentrated hydrochloric acid were dissolved in water to give 100 ml of an aniline solution. The aniline solution was chilled to $-10°$ C. On the other hand, 21.9 g of concentrated hydrochloric acid and 6.28 g of ammonium persulfate were also dissolved in water to give 100 ml of a solution. The latter solution was also chilled to $-10°$ C. and was then slowly added dropwise to the aniline solution, followed by stirring at $-10°$ C. for 6 hours. The thus obtained polyaniline having a number average molecular weight of 12,000 (GPC in N-methyl-2-pyrrolidone as a solvent and converted relative to polystyrene) was washed thoroughly with water, followed by undoping treatment with aqueous ammonia.

The resultant soluble polyaniline was dispersed in 200 ml of water, followed by the addition of 50 ml of hydrazine in a nitrogen atmosphere. The mixture thus obtained was continuously stirred for 24 hours at room temperature. The resultant solid precipitate was collected by filtration and then dried, whereby a reduced polyaniline (number average molecular weight: 12,000) of a grayish white color was obtained.

On the other hand, a polyether having a glycidyl group at its terminal was synthesized according to the process described in I. IKEDA, Y. SHIMAZAKI, and K. SUZUKI: J. Appl. Polym. Sci , Vol 42, 2871-2877 (1991). Namely, 100 g of polyethyleneglycol monomethyl ether (average molecular weight: about 1900, produced by Aldrich Co., j=42 in the formula (IV)) was dissolved in 400 ml of dehydrated tetrahydrofuran, followed by reacting with 1.9 g of sodium hydride at 30° C. for 2 hours. After addition of 20 g of epichlorohydrin, the mixture was allowed to react at 40° C. for 4 hours. Ether was added to the mixture to precipitate the procuct. After the precipitate was sufficiently washed with ether, it was dissolved in chloroform to remove insoluble products. Thereafter, it was reprecipitated using ether. This treatment of reprecipitation was repeated 2 times, and the precipitate was sufficiently dried to obtain a polyether having a glycidyl ether group at its terminal. As a result of measurement of consumption of hydrobromic acid in glacial acetic acid, convertion of the terminal hydroxyl group into glycidyl ether group was confirmed in 99% of the polyether molecules.

To a solution prepared by dissolving 1 g of the above described reduced polyaniline in 30 ml of N-methyl-2-pyrrolidone was added 4.29 g of the polyether having a glycidyl group at its terminal (average molecular weight: 1900, r=about 42 in the fromula (II-3)), and the thus obtained mixture was reacted at 50° C. for 4 hours and then at 80° C. for 2 hours with heating. The reaction mixture was poured in 1 liter of methanol containing 10% hydrochloric acid with stirring, and the resultant precipitate was collected by filtration. After it was allowed to stand under an atmosphere of ammonia gas, it was sufficiently washed with ether, followed by drying to obtain 5.05 g of a branched polyaniline derivative of the present invention (k+m+n=about 104).

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 19% of the total number of nitrogen atoms contained in the polyaniline chain. (k/(k+2m+n)=0.19). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 1.5 S/cm after having been doped by exposing the film to a hydrochloric acid gas for 24 hours.

The branched polyaniline derivative was also soluble in organic solvents such as N,N-dimethylacetamide, N,N-dimethylformamide, pyridine, chloroform, dichloroethane, dichloromethane and tetrahydrofuran instead of N-methyl-2-pyrrolidone, and it is therefore processible. Ii is gelatinizable in water and alcohols such as methanol and ethanol, whereby it was processible too.

EXAMPLE 18

A branched polyaniline derivative (k+m+n=about 98) was obtained in a yield of 1.45 g in a similar manner to Example 17 except for using 0.55 g of a polyether having an average molecular weight of about 5060 (r=about 110 in the formula (II-3) in place of the polyether in Example 17. The resultant branched polyaniline derivative was soluble in the same solvents as those in Example 17 and also gelled in water and alcohols. It was therefore processible.

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 0.9% of the total number of nitrogen atoms contained in the polyaniline chain. (k/(k+2m+n)=0.009). $^{13}$C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 2.5 S/cm after having been doped by exposing the film to a hydrochloric acid gas for 24 hours.

EXAMPLE 19

A branched polyaniline derivative (k+m+n=about 128) was obtained in a yield of 5.34 g in a similar manner to Example 17 except for using 4.47 g of polyether having an average molecular weight of about 400 (r=about 7 in the formula (II-3)) in place of the polyether in Example 17. The resultant branched polyaniline derivative was soluble in the same solvents as those in Example 17 and also gelled in water and alcohols. It was therefore processable.

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 97% of the total number of nitrogen atoms contained in the polyaniline chain. (k/(k+2m+n)=0.97). $^{13}$C NMR spectrum revealed m/(n+m)=0.50.

The resultant branched polyaniline dissolved by stirring 1 g thereof in 5 g of N-methyl-2-pyrrolidone at room temperature. From the resultant solution, a self-standing film was obtained by casting. Its conductivity was 0.01 S/cm after having been doped by exposing the film to a hydrochloric acid gas for 24 hours.

EXAMPLE 20

A branched polyaniline derivative (k+m+n=about 121) was obtained in a yield of 2.24 g in a similar manner to Example 17 except for using 1.48 g of polyethyleneglycol laurylglycidyl ether (average molecular weight: about 1340, r=about 25 in the formula (II-3)) in place of the polyether in Example 17. The resultant branched polyaniline derivative was soluble in the same solvents as those in Example 17 and also gelled in water and alcohols. It was therefore processable.

The polyethyleneglycol monolarylglycidyl ether used was synthesized according to conventional known methods using polyethyleneglycol monolauryl ether (molecular weight of about 1290, r=about 25 in the formula (IV))

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 9% of the total number of nitrogen atoms contained in the polyaniline chain. (k/(k+2m+n)=0.09). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 0.5 S/cm after having been doped by exposing the film to a hydrochloric acid gas for 24 hours.

EXAMPLE 21

A branched polyaniline derivative (k+m+n=about 100) was obtained in a yield of 4.87 g in a similar manner to Example 17 except for using 4.09 g of polyethyleneglycol p-nonylphenylglycidyl ether (average molecular weight: about 500, r=about 5 in the formula (II-3)) in place of the polyether in Example 17. The resultant branched polyaniline derivative was soluble in the same solvents as those in Example 17 and also gelled in water and alcohols. It was therefore processable.

The polyethyleneglycol p-nonylphenylglycidyl ether used was synthesized according to conventional known methods using polyethyleneglycol mono-p-nonylphenyl ether (molecular weight of about 440, r=about 5 in the formula (IV))

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 72% of the total number of nitrogen atoms contained in the polyaniline chain. (k/(k+2m+n)=0.72) 13C NMR spectrum revealed m/(n+m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 0.02 S/cm after having been doped by exposing the film to a hydrochloric acid gas for 24 hours.

EXAMPLE 22

A branched polyaniline derivative (k+m+n=about 113) was obtained in a yield of 4.55 g in a similar manner to Example 17 except for using 3.83 g of polyethyleneglycol laurylglycidyl ether (average molecular weight: about 700, r=about 10 in the formula (II-3)) in place of the polyether in Example 17. The resultant branched polyaniline derivative was soluble in the same solvents as those in Example 17 and also gelled in water and alcohols. It was therefore processible. The polyethyleneglycol laurylglycidyl ether used was synthesized according to conventional known methods using polyethyleneglycol monolauryl ether (molecular weight of about 640, r=about 10 in the formula (IV)).

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 47% of the total number of nitrogen atoms contained in the polyaniline chain. (k/(k+2m+n)=0.47). $^{13}$C NMR spectrum revealed m/(n+m)=0.35.

The resultant branched polyaniline dissolved by stirring 1 g thereof in 5 g of N-methyl-2-pyrrolidone at room temperature. From the resultant solution, a self-standing film was obtained by casting. Its conductivity was 0.02 S/cm after having been doped by exposing the film to a hydrochloric acid gas for 24 hours.

EXAMPLE 23

A branched polyaniline derivative (k+m+n=about 99) was obtained in a yield of 3.25 g in a similar manner to Example 17 except for using 2.77 g of polyethyleneglycol oleylglycidyl ether (average molecular weight: about 2350, r=about 50 in the formula (II-3)) (2.77 g) in place of the polyether in Example 17. The resultant branched polyaniline derivative was soluble in the same solvents as those in Example 17 and also gelled in water and alcohols. It was therefore processible. The polyethyleneglycol oleylglycidyl ether used was synthesized according to conventional known methods using polyethyleneglycol monooleyl ether (molecular weight of about 2470, r=about 50 in the formula (IV)).

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain Of the branched polyaniline derivative was confirmed to have a polyaniline structure.

From the yield of the reaction, the number of nitrogen atoms taking part in graft structure represented by the formula (III) was found to be about 8.6% of the total number of nitrogen atoms contained in the polyaniline chain. (k/(k+2m+n)=0.086). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 0.07 S/cm after having been doped by exposing the film to a hydrochloric acid gas for 24 hours.

EXAMPLE 24

Polyethyleneglycol monomethyl ether (average molecular weight: about 2000, produced by Aldrich Co.) was allowed to react with 1.5 times by mol of NaH and then with 4-bromo-1-butene to change its terminal to a butenyl ether group. It was then treated with benzoic peracid in tetrahydrofuran to epoxidize the terminal double bond. As a result of mesurement of consumption of HBr in glacial acetic acid. it was confirmed that terminal hydroxyl group was converted into epoxy group in a rate of 99%.

4.31 g of the resultant polyether having an epoxy group at its terminal was processed by the same manner as in Example 17 to obtain 5.01 g of a branched polyaniline derivative (k+m+n=about 103). The resultant branched polyaniline derivative was soluble in the same organic solvents as those in Example 7 and it was therefore processible.

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain Of the branched polyaniline derivative was confirmed to have a polyaniline structure.

From the yield of the reaction, the number of nitrogen atoms taking part in graft structure represented by the formula (III) was found to be about 18% of the total number of nitrogen atoms contained in the polyaniline chain. (k/(k+2m+n)=0.18). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 1.3 S/cm after having been doped by exposing the film to a hydrochlorid acid gas for 24 hours.

EXAMPLE 25

Ethyleneoxide (80% by mol) and methyl glycidyl ether (20% by mol) were copolymerized to prepare a polyether having hydroxyl groups at both terminals (average molecular weight: 2000). The copolymer was allowed to react with methyl iodide in a presence of 2.1 time by mol of NaH, and the resultant monomethylated polyether was separated by a silica gel column. 2.2 g of the resulted polyether was processed by the same manner as in Example 17 to obtain 3.0 g of a branched polyaniline derivative (k+m+n=about 100). The resultant branched polyaniline derivative was soluble in the same organic solvents as those in Example 7 and it was therefore processible.

When the resultant branched polyaniline derivative was analyzed by infrared absorption spectroscopy, absorptions at 1650, 1734 cm$^{-1}$ (C=O stretching) and 2850-2950 cm$^{-1}$ (aliphatic the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 8.9% of the total number of nitrogen atoms contained in the polyaniline chain. (k/(k+2m+n)=0.089). $^{13}$C NMR spectrum revealed m/(n+m)=0.34.

The resultant branched polyaniline dissolved by stirring 1 g thereof in 5 g of N-methyl-2-pyrrolidone at room temperature. From the resultant solution, a self-standing film was obtained by casting. Its conductivity was 1.9 S/cm after having been doped by exposing the film to a hydrochloric acid gas for 24 hours.

EXAMPLE 26

Ethyleneoxide (80% by mol) and 3-methyltetrahydrofuran (20% by mol) were copolymerized to prepare a polyether having hydroxyl groups at both terminals (average molecular weight: 1900). The copolymer was processed by the same manner as in Example 25 to produce polyether having a glycidyl ether group. 2.2 g of the resulted polyether were processed by the same manner as in Example 17 to obtain 2.9 g of a branched polyaniline derivative (k+m+n=about 100). The resultant branched polyaniline derivative was soluble in the same organic solvents as those in Example 7 and it was therefore processible.

When the resultant branched polyaniline derivative was analyzed by infrared absorption spectroscopy, absorptions at 3300 cm$^{-1}$ (O—H stretching) and 2850-2950 cm$^{-1}$ (aliphatic C—H stretching) assigned to the graft structure represented by the above formula (III) were observed. Moreover, absorptions at 1600, 1500, 1300, 1170 and 820 cm$^{-1}$ assigned to the polyaniline structure were observed, whereby the main polymer chain of the branched polyaniline derivative was confirmed to have a polyaniline structure.

From the yield of the reaction, the number of nitrogen atoms taking part in graft structure represented by the formula (III) was found to be about 7.9 % of the total number of nitrogen atoms contained in the polyaniline chain. (k/(k+2m+n)=0.079). $^{13}$C NMR spectrum revealed m/(n . m)=0.33.

The resultant branched polyaniline dissolved by stirring 1 g thereof in 5 g of N-methyl-2-pyrrolidone at room temperature. From the resultant solution, a self-standing film was obtained by casting. Its conductivity was 1.1 S/cm after having been doped by exposing the film to a hydrochloric acid gas for 24 hours.

I claim:

1. A polyaniline derivative which is represented by the following formula (I) having a quinodiimine unit structure, an imino-1,4-phenylene unit structure and a N-polyether chain substituted imino-1,4-phenylene unit structure bonding at random to one another,

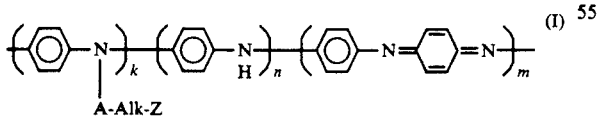

wherein k is an integer of at least 1, m and n each is zero or an integer of at least 1, k+m+n=10 to 5,000, m/(n+m)=0 to 1, Alk represents a polyether chain having a number average molecular weight of 100 to 100,000 as measured by GPC and having oxygen atoms at both terminals, A represents a linking group selected from the group consisting of the following formula (1) through (9),

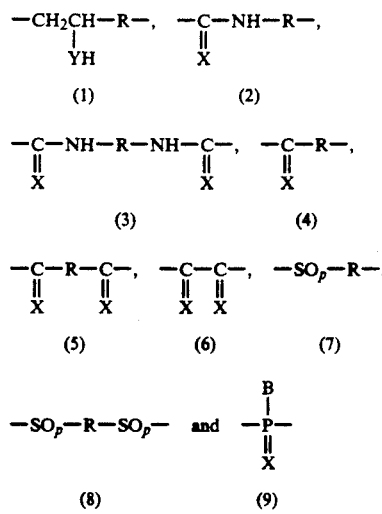

wherein R is a divalent hydrocarbon group having 1 to 30 carbon atoms, a divalent hydrocarbon group having 1 to 30 carbon atoms substituted with a halogen atom or COOM, wherein M is a hydrogen atom, Li, Na, K, Cs, Rb or NH$_4$, X represents an oxygen atom or a sulfur atom, Y represents an oxygen atom, a sulfur atom or —NH—, B represents a hydrocarbon group having 1 to 30 carbon atoms or an alkoxy group having 1 to 30 carbon atoms, and p is zero or an integer of 1 or 2, and Z represents a hydrogen atom, a hydrocarbon group having 1 to 30 carbon atoms, R$^1$C(=O)— or R$^1$OC(-=O)CH$_2$—, wherein R$^1$ is a hydrogen atom, an alkyl group having 1 to 30 carbon atoms, an alkenyl group, a benzyl group, an aryl group, a substituted alkyl group having 1 to 30 carbon atoms, a substituted alkenyl group, a substituted benzyl group, or a substituted aryl group.

2. A polyaniline derivative according to claim 1, wherein A is a group selected from the above formulas (2) through (9) and k/(k+2m+n) is a value in a range of from 0.0001 to 0.4.

3. A polyaniline derivative according to claim 1, wherein A is a group represented by the above formula (1) and k/(k+2m+n) is a value in a range of from 0.0001 to 1.

4. A polyaniline derivative according to claim 1, wherein A represents a linking group selected from the group consisting of the following formula (10) through (17)

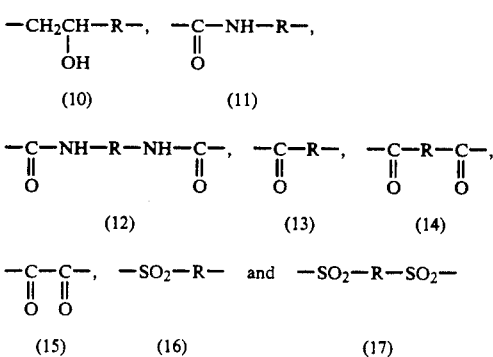

wherein R has the same meaning as described above.

5. A polyaniline derivative according to claim 4, wherein the N-polyether chain substituted imino-1,4-phenylene unit structure is represented by the following formula (III-1):

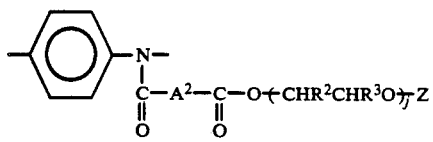

wherein $A^2$ represents an alkylene group having 1 to 4 carbon atoms, an alkenylene group having 1 to 4 carbon atoms, or a 1,2-phenylene group, $R^2$ and $R^3$ independently represent each a hydrogen atom or an alkyl group having 1 to 5 carbon atoms, j is an integer of from 6 to 200 and Z has the same meaning as described above.

6. A polyaniline derivative according to claim 4, wherein the N-polyether chain substituted imino-1,4-phenylene unit structure is represented by the following formula (III-2):

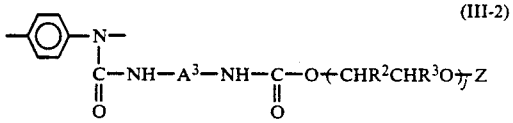

wherein $A^3$ represents an alkylene group having 1 to 6 carbon atoms or a phenylene group, and $R^2$, $R^3$, Z and j have the same meaning as described above.

7. A polyaniline derivative according to claim 4, wherein the N-polyether chain substituted imino-1,4-phenylene unit structure is represented by the following formula (III-3):

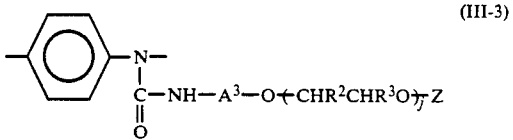

wherein $A^3$, $R^2$, $R^3$, Z and j have the same meaning as described above.

8. A polyaniline derivative according to claim 4, wherein the N-polyether chain substituted imino-1,4-phenylene unit structure is represented by the following formula (III-4):

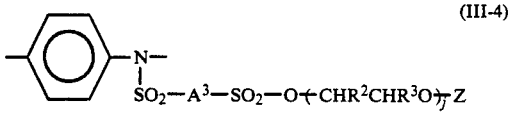

wherein $A^3$, $R^2$, $R^3$, Z and j have the same meaning as described above.

9. A polyaniline derivative according to claim 4, wherein the N-polyether chain substituted imino-1,4-phenylene unit structure is represented by the following formula (III-5):

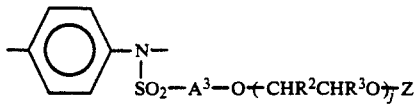

wherein $A^3$, $R^2$, $R^3$, Z and j have the same meaning as described above.

10. A polyaniline derivative according to claim 4, wherein the N-polyether chain substituted imino-1,4-phenylene unit structure is represented by the following formula (III-6):

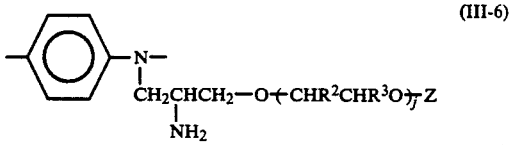

wherein $R^2$, $R^3$, Z and j have the same meaning as described above.

11. A polyaniline derivative according to claim 4, wherein the N-polyether chain substituted imino-1,4-phenylene unit structure is represented by the following formula (III-7):

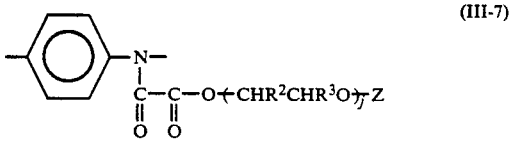

wherein $R^2$, $R^3$, z and j have the same meaning as described above.

12. A polyaniline derivative according to claim 4, wherein the N-polyether chain substituted imino-1,4-phenylene unit structure is represented by the following formula (III-8):

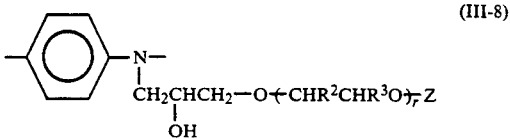

wherein r is an integer of 2 to 200, and $R^2$, $R^3$ and z have the same meaning as described above.

13. A process for producing a polyaniline derivative according to claim 1, which comprises a step of treating a polymer obtained by oxidatively polymerizing aniline with ammonia to prepare a soluble polyaniline, a step of treating the soluble polyaniline with excess hydrazine to prepare a reduced polyaniline having a number average molecular weight of 2,000 to 500,000 as measured by GPC composed of an imino-1,4-phenylene unit structure, and a step of reacting the reduced polyaniline with a polyether compound represented by the following formula (II) having a functional group capable of reacting with aromatic secondary amines at its terminal:

wherein W is a functional group selected from the group consisting of the following formulas (a) through (g)

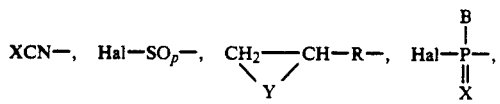

(a)  (b)  (c)  (d)

(e)  (f)  (g)

wherein Hal represents a halogen atom, and X, Y, B and p have the same meaning as described above, $A^1$ represents a direct bond, a divalent hydrocarbon group having 1 to 30 carbon atoms, a divalent hydrocarbon group having 1 to 30 carbon atoms substituted with halogen atoms, —R—C(=X)—, —R—NHC(=X)—, —R—$SO_p$— or —C(=X)—, wherein R and X have the same meaning as described above, but $A^1$ is a trivalent hydrocarbon group having 1 to 30 carbon atoms when W represents an internal carboxylic anhydride group (e), and Alk and Z have the same meaning as described above.

14. The process according to claim 13, wherein the compound represented by the formula (II) is selected from compounds represented by the following formulas (II-1) to (II-11):

$$HOOC-A^2-CO-O(CHR^2CHR^3O)_{\overline{j}}Z \quad (II\text{-}1)$$

$$Hal-CO-A^2-CO-O(CHR^2CHR^3O)_{\overline{j}}Z \quad (II\text{-}2)$$

$$\underset{O}{CH_2\!\!-\!\!CH}-CH_2-O(CHR^2CHR^3O)_{\overline{j}}Z \quad (II\text{-}3)$$

$$OCN-A^3-NH-\underset{\underset{O}{\|}}{C}-O(CHR^2CHR^3O)_{\overline{j}}Z \quad (II\text{-}4)$$

$$OCN-A^3-O(CHR^2CHR^3O)_{\overline{j}}Z \quad (II\text{-}5)$$

$$Cl-SO_2-A^3-SO_2-O(CHR^2CHR^3O)_{\overline{j}}Z \quad (II\text{-}6)$$

$$Cl-SO_2-A^3-O(CHR^2CHR^3O)_{\overline{j}}Z \quad (II\text{-}7)$$

(II-8)

[phthalic anhydride structure with]
$$-C-O(CHR^2CHR^3O)_{\overline{j}}Z$$

$$HOOC-A^3-O(CHR^2CHR^3O)_{\overline{j}}Z \quad (II\text{-}9)$$

$$Cl-\underset{\underset{O}{\|}}{C}-\underset{\underset{O}{\|}}{C}-O(CHR^2CHR^3O)_{\overline{j}}Z \quad (II\text{-}10)$$

$$\underset{\underset{H}{N}}{CH_2\!\!-\!\!CH}-CH_2-O(CHR^2CHR^3O)_{\overline{j}}Z \quad (II\text{-}11)$$

wherein $A^2$, $A^3$, $R^2$, $R^3$, Z, j and r have the same meaning as described above.

* * * * *